United States Patent [19]

Flamm

[11] Patent Number: 4,491,862
[45] Date of Patent: Jan. 1, 1985

[54] COLOR-TELEVISION RECEIVER WITH AT LEAST ONE DIGITAL INTEGRATED CIRCUIT FOR PROCESSING THE COMPOSITE COLOR SIGNAL

[75] Inventor: Peter M. Flamm, Freiburg, Fed. Rep. of Germany

[73] Assignee: ITT Industries, Inc., New York, N.Y.

[21] Appl. No.: 388,775

[22] Filed: Jun. 15, 1982

[51] Int. Cl.³ .......................... H04N 9/46; H04N 9/02
[52] U.S. Cl. ...................................... 358/21 R; 358/19
[58] Field of Search .................. 358/21 R, 11, 17, 19, 358/23, 38, 39, 40

[56] References Cited

U.S. PATENT DOCUMENTS 4,251,831 2/1981 Kamath ............................. 358/21 R
4,352,123 9/1982 Flamm ............................. 358/21 R Primary Examiner—Michael A. Masinick
Attorney, Agent, or Firm—Donald J. Lenkszus

[57] ABSTRACT

To digitally synchronize the chrominance-subcarrier oscillator in the form of a phase-locked loop with the color burst contained in the composite color signal, suitable digital subcircuits are provided. During the keying pulse, the digital R-Y and B-Y color-difference signals are accumulated line by line. The corresponding R-Y value is then added to a desired phase value or a tint-control value, and for deviations from the burst phase between +90° and −90°, the sum signal, after being limited if necessary, is applied to a digital-to-analog converter, filtered in a low-pass filter, and then used to control the chrominance-subcarrier oscillator. If the phase deviations lie between +90° and +180° or −90° and −180°, the digital-to-analog converter is constantly fed with the upper or the lower limit value, respectively, via a switching stage. The latter has three switch positions, one for direct transfer and one for each of the two limit values, with the sign bit of the accumulated R-Y or B-Y value effecting the appropriate selection.

16 Claims, 5 Drawing Figures

COLOR-TELEVISION RECEIVER WITH AT LEAST ONE DIGITAL INTEGRATED CIRCUIT FOR PROCESSING THE COMPOSITE COLOR SIGNAL

BACKGROUND OF THE INVENTION

1. Field of the Invention

The present invention relates to a color-television receiver with at least one digital integrated circuit for processing the composite color signal.

2. Description of the Prior Art

A color-television receiver is described in Offenlegungsschrift DE No. 28 54 236 Al, in which the composite color signal is processed there by all-digital circuitry. To accomplish this, the color-television receiver contains a squarewave clock generator for generating at least three clock signals which serves as a chrominance-subcarrier oscillator. The first clock signal is at four times the chrominance-subcarrier frequency, while the two other clock signals are at the chrominance-subcarrier frequency, with the first and the second clock signal having a 1:1 mark/space ratio. The prior art color-television receiver further includes an analog-to-digital converter which is clocked by the first clock signal and whose analog input is presented with the composite color signal. At the instants the respective amplitudes of the undemodulated chrominance signal are equal to the amplitudes of the respective color-difference signal, the analog-to-digital converter forms a parallel binary word from the amplitude of the composite color signal, and a subcircuit is provided which generates the digital Red-minus-Luminance difference signal and the digital Blue-minus-Luminance difference signal, i.e., the R-Y color-difference signal and the B-Y color-difference signal.

In circuits of color-television receivers using analog signal processing, the chrominance-subcarrier oscillator is commonly locked in frequency and phase to the received chrominance subcarrier, which is transmitted in the form of so-called color bursts. The burst is first separated from the composite color signal by means of a suitably conditioned keying signal and then used for synchronizing purposes; cf. the book by O. Limann entitled "Fernsehtechnik ohne Ballast", 12th Edition, Munich, 1978, pages 209 to 217.

SUMMARY OF THE INVENTION

The object of the invention is to permit the chrominance-subcarrier oscillator in a color-television receiver with at least one digital integrated circuit for processing the composite color signal to be synchronized by means of the color burst using digital signal-processing circuitry.

One of the advantages of the invention is that the all-digital signal processing substantially eliminates the need for nonintegrable circuit elements, i.e., particularly for coils and capacitors of nonintegrable capacitance, and that the subcircuits can preferably be implemented using integrated insulated-gate field-effect transistor circuits, i.e., so-called MOS technology. This technology is better suited for implementing digital circuits than the so-called bipolar technology.

DESCRIPTION OF THE INVENTION

Figure 1:
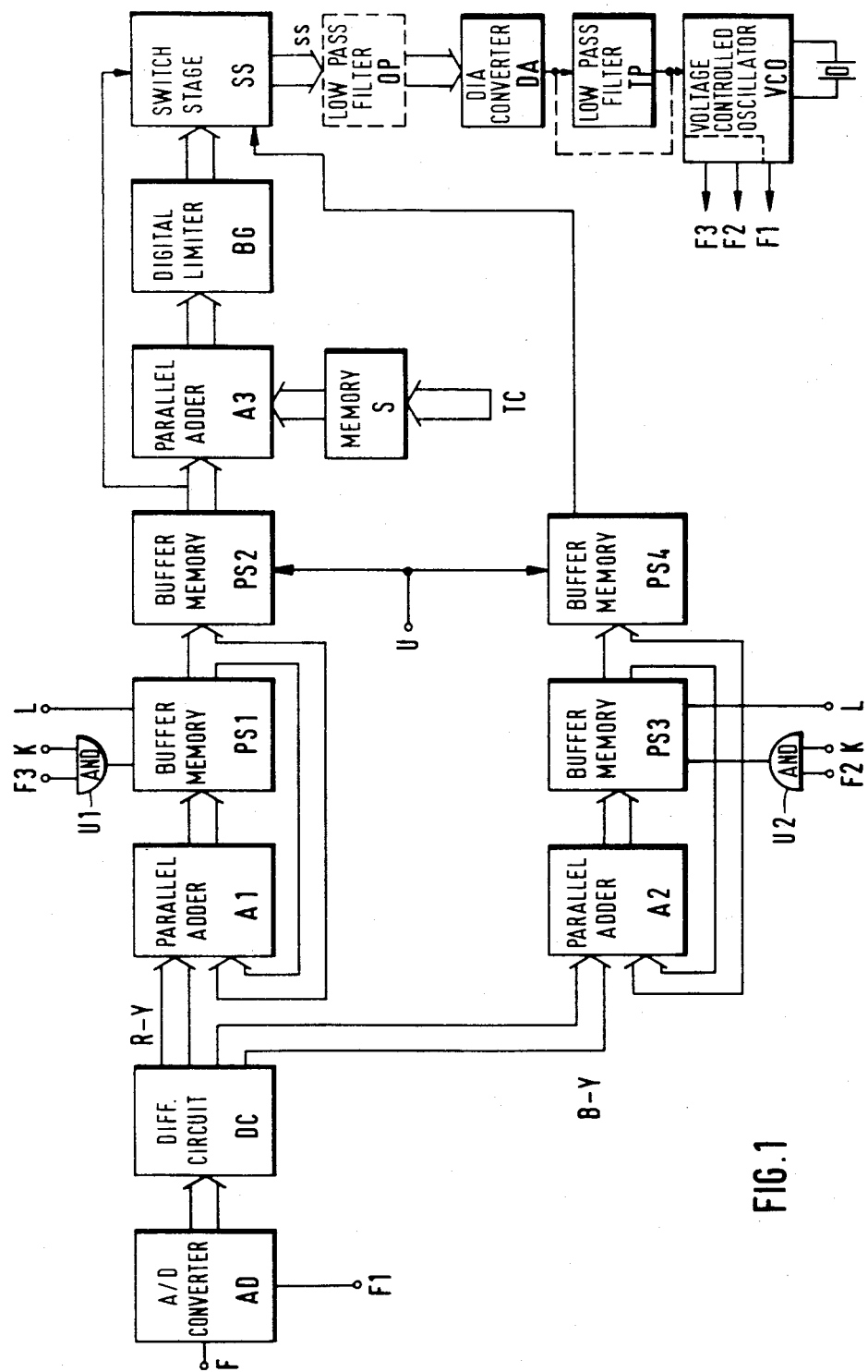
FIG. 1 is a block diagram showing an embodiment of those subcircuits of a color-television receiver according to the invention which are necessary to synchronize the chrominance-subcarrier oscillator.

FIG. 1 shows the block diagram of an embodiment containing those subcircuits of a color-television receiver using digital signal processing techniques which are essential for the invention. The units corresponding to the prior art disclosed in the above-mentioned Offenlegungsschrift are the analog-to-digital converter AD, whose analog input is fed with the composite color signal F and the first clock signal F1, the frequency of which is at four times the chrominance-subcarrier frequency and which has a 1:1 mark/space ratio, see also FIG. 2a, and the subcircuit DC.

The parallel binary word appearing at the output of the analog-to-digital converter AD is so processed by the subcircuit DC that the two outputs of the latter provide the R-Y color-difference signal and the B-Y color-difference signal in digital form. The subcircuit DC corresponds essentially to those subcircuits of the known arrangement in the above Offenlegungsschrift which are disposed there between the analog-to-digital converter 2 and the subcircuits 40 and 60. An arrangement for digitally controlling the amplitude of the burst as disclosed in the prior European Application No. 80 10 6654.9 which corresponds to U.S. patent application Ser. No. 311,218 filed Oct. 14, 1981 may be provided between the analog-to-digital converter AD and the subcircuit DC or form part of the latter.

Figure 2:
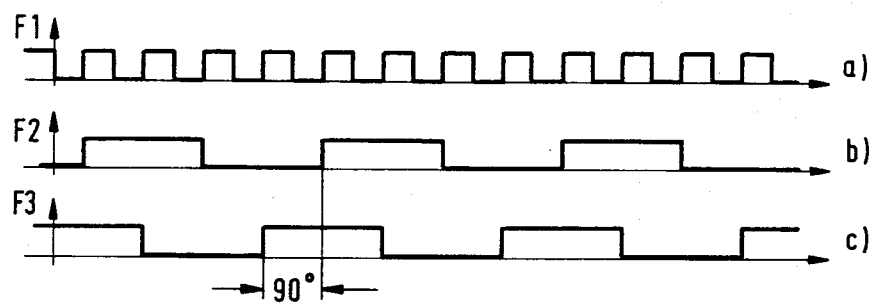
FIG. 2 shows the waveforms of the three clock signals used.
Figure 3:
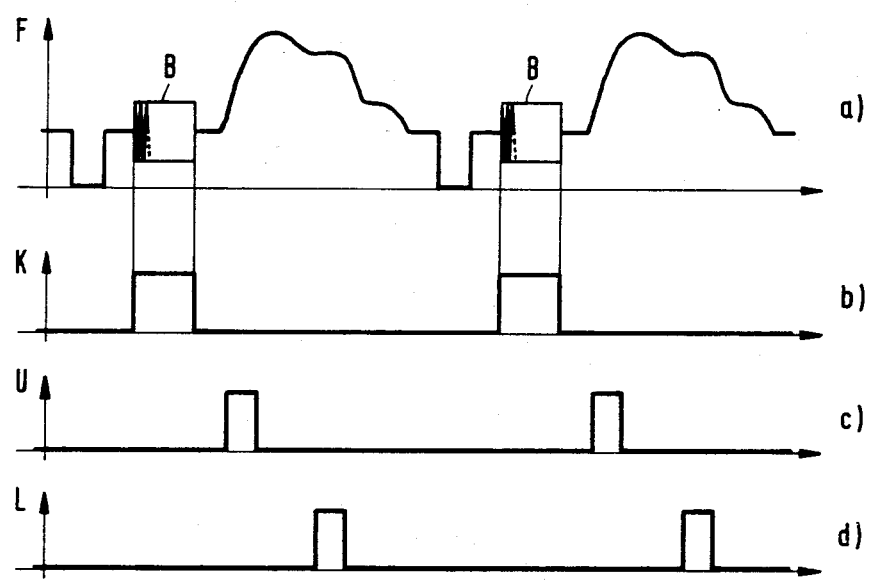
FIG. 3 shows the waveforms and time assignment of the keying signal and of further signals.

The positive R-Y color-difference signal is applied to the first input of the first parallel adder A1, whose output feeds the first buffer memory PS1. The output signal of the first buffer memory PS1 is applied to the second input of the first parallel adder A1 and to the input of the second buffer memory PS2. The first buffer memory PS1 has an enable input and a clear input, so that information will only be written into the memory on application of an appropriate signal to the enable input, and cleared on application of a signal to the clear input. The signal at the enable input is produced by means of the first AND gate U1, which ANDs the third clock signal F3 and the keying signal K. The waveforms of these two signals F3, K are shown in FIGS. 2c and 3b. The third clock signal F3 is at the chrominance-subcarrier frequency and, like the second clock signal F2, shown in FIG. 2b, has a 1:1 mark/space ratio. However, the third clock signal F3 leads the second clock signal F2 by 90°. The duration of the keying pulse K is equal to that of the burst signal B, see FIG. 3a, in which the waveform of the composite color signal F is shown schematically and not to scale.

As the enable input of the first buffer memory PS1 is energized exactly for the duration of the burst signal B, precisely those digital words which represent the burst B are entered into the first memory PS1, namely once per picture line, because the keying pulse K occurs once per line, as is well known.

As a result of the return of the signal from the output of the first buffer memory PS1 to the second input of the first parallel adder A1, the digital words occurring during the first signal are summed up, so that the arrangement formed by the two subcircuits A1, PS1 can also be regarded as an accumulator. The signal summed in the first buffer memory PS1 is written into the second buffer memory PS2 by applying the enabling signal U to the enable input of this memory; this enabling signal U occurs once per picture line at the end of the burst B and, thus, subsequent to the keying pulse K in time, see FIG. 3c.

In like manner, the positive B-Y signal is processed by means of the second parallel adder A2 and the third and fourth buffer memories PS3, PS4, with the subcircuits A2, PS3 again acting as an accumulator because of the corresponding signal return. The enable input of the third buffer memory PS3 is preceded by the second AND gate U2, which ANDs the second clock signal F2, shown in FIG. 2b, and the keying signal K, shown in FIG. 3b. The clear input is fed with the clearing pulse L, which follows the enabling pulse U in time. Thus, the accumulated digital word is transferred into the fourth buffer memory PS4, whose enable input is presented with the enabling pulse U, at the end of the burst signal B as well. The buffer memory PS4 can be of quite simple design, because only the sign bit of the output signal of the buffer memory PS3 is of interest and, thus, must be further processed.

The output of the second buffer memory PS2 is coupled to the first input of the third parallel adder A3, whose second input is connected to the output of the memory S, into which a constant value is written by the set manufacturer in the case of PAL color-television receivers, or into which a digital tint-control signal TC is written in the case of NTSC color-television receivers.

The output of the third parallel adder A3 is coupled to the input of the digital limiter BG, whose output controls the switching stage SS. The latter has three switch positions and two switch inputs, the first of which is fed with the sign bit of the output signal of the second buffer memory PS2, while the second is connected to the output of the fourth buffer memory PS4. The output signal of the switching stage SS is the digital control signal for the chrominance-subcarrier oscillator VCO, which signal is applied to the latter after low-pass filtering and digital-to-analog conversion. Two possibilities of implementing these two functions are shown in FIG. 1, namely the variant indicated by solid lines, in which the signal ss is applied to the digital-to-analog converter DA and then filtered in the analog low-pass filter TP, and the second variant, indicated by dashed lines, in which the signal ss passes through the digital low-pass filter TP and is then applied to the digital-to-analog converter DA, whose output controls the chrominance-subcarrier oscillator VCO direct.

Figure 4:
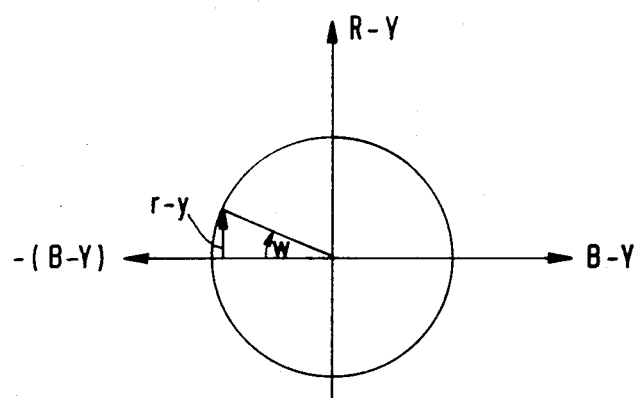
FIG. 4 shows a vector diagram to explain the phase relationships between the two color-difference signals.
Figure 5:
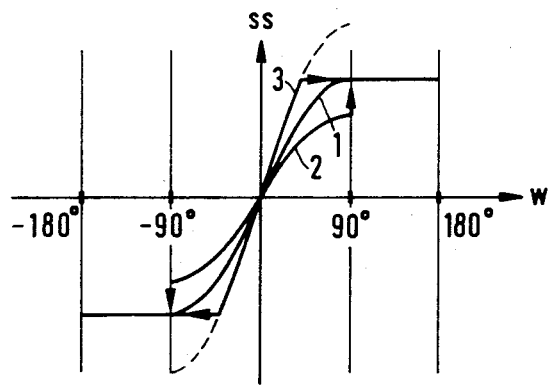
FIG. 5 is an analog representation of the output signal of the switching stage contained in the circuit arrangement according to the invention.

FIGS. 4 and 5 serve to explain the purpose and operation of the digital limiter BG and the switching stage SS. FIG. 4 shows the vector diagram given by the standard assignment of the two color-difference signals; the diagram takes into account that, while the reference phase angle O corresponds to the signals B-Y=O and R-Y=O, the desired phase of the chrominance-subcarrier wave is equal to the burst phase of 180° related to the reference phase and averaged over two lines. The desired phase thus corresponds to the signals —(B-Y)=O and R-Y=O. In FIG. 4, therefore, a deviation from this desired phase by the angle w is shown from the reference direction —(B-Y).

An essential aspect of the invention is that for a phase angle w of ±90° from —(B-Y), the digital value assigned to this angle w, i.e., r-y, serves as the control signal ss for the chrominance-subcarrier oscillator VCO. In the analog representation of FIG. 5, the curve r-y is thus sinusoidal between the values —90° and +90°, because it corresponds to (R-Y) sin w. These are the curves 1, 2 and 3 in FIG. 5. Curve 1 is shown as the curve with the desired amplitude of R-Y, while the two other curves 2 and 3 represent possible smaller and greater amplitudes, respectively. In the latter case, the limiting action of the digital limiter BG sets in within the angular range ±90°, as is shown by the horizontal portions of curve 3, which are marked with an arrow. The output signal of the digital limiter BG thus has the digital values occurring within this angular range.

This output signal is applied to the input of the switching stage SS, which has three switch positions, as mentioned above. In one of the switch positions, the output signal of the digital limiter BG is transferred to the output of the stage unchanged. In the other two switch positions, however, the output of the switching stage SS provides a signal which is equal to the upper and the lower limit value, respectively. Which of these three switch positions the switching stage SS is in is determined by the two single-digit binary signals at its two switch inputs, the first of which, as mentioned previously, is connected to the sign-bit-carrying output line of the second buffer memory PS2, while the second is connected to the output of the fourth buffer memory PS4.

The assignment of the two switch signals at the two switch inputs to the B-Y signal is such that in the two right-hand quadrants of FIG. 4, i.e., if B-Y is positive, the switching stage SS switches to the two limit values, with the upper limit value being transferred to the output and appearing there as the output signal ss if R-Y is positive, and the lower limit value being transferred there if R-Y is negative.

If, for example, the instantaneous signal r-y in FIG. 5 corresponds to curve 2 and is positive, curve 2 will "jump" to the upper limit value between 90° and 180° when the angle w reaches 90°; this is indicated there by the vertical arrow. Similarly, if r-y is negative, curve 2 will jump to the lower limit value between —90° and —180° when the angle w reaches —90°.

To illustrate this mode of operation, a few exemplary digital values and words are given in the following Table. The leftmost bit in the signal ss is the sign bit, and in this example, a "1" as the sign bit signifies "negative", while a "0" signifies "positive". A "1" in the column "r-y too great" means just this. The output signal ss is given in the two's complement code; the greatest number (without sign) is 1111111, and the smallest number (without sign) is 0000000.

| Line | Sign of R-Y | Sign of B-Y | r-y too great | Output signal ss |
|---|---|---|---|---|
| 1 | 0 | 0 | 0 | 01111111 |
| 2 | 0 | 0 | 1 | 01111111 |
| 3 | 0 | 1 | 0 | Output signal of BG |
| 4 | 0 | 1 | 1 | 01111111 |

-continued

| Line | Sign of R-Y | Sign of B-Y | r-y too great | Output signal ss |
|---|---|---|---|---|
| 5 | 1 (−) | 0 (+) | 0 | 10000000 |
| 6 | 1 | 0 | 1 | 10000000 |
| 7 | 1 | 1 (−) | 0 | Output signal of BG |
| 8 | 1 | 1 | 1 | 10000000 |

As is readily apparent, lines 1 and 2 correspond to a value in the first quadrant of FIG. 4, so the output signal ss assumes the upper limit value. The latter also occurs in the case of line 4 because, although B-Y is negative there, r-y is too great. The lower limit value occurs in a comparable manner in the cases of lines 5, 6, and 8, while the output signal of the digital limiter BG appears as the output signal in the cases of lines 3 and 7, for only in these two cases is B-Y negative, while r-y is not too great.

By means of the input signal TC of the memory S, a reference value for the adjustment of the chrominance-subcarrier oscillator can be preset, as in the case of PAL color-television receivers, for example. In the case of receivers using the NTSC system, this signal is the tint-control signal, which is produced in the present case in digital form by another subcircuit of the color-television receiver.

The dashed portion of the chrominance-subcarrier oscillator VCO indicates that the latter generates the first clock signal F1 by means of a crystal-oscillator circuit and derives the second and third clock signals F2, F3 therefrom by means of suitable frequency dividers.

The stripe-like connecting lines in FIG. 1 indicate that these are multiconductor parallel lines for transferring digital words in parallel, such as an eight-wire bus, while the solid lines represent single-wire lines over which only single-digit binary signals are transferred.

What is claimed is:

1. Color television circuitry comprising:
   a chrominance subcarrier oscillator for generating a first clock signal at four times the chrominance subcarrier frequency;
   first circuit means clocked by said first clock signal for processing an analog composite color signal to provide digital first color difference signals and digital second color difference signals;
   second circuit means for digitally synchronizing said chrominance subcarrier oscillator with the burst contained in said color signal, said second circuit means comprising:
   first means for accumulating said digital first color difference signals during a keying pulse which is identical in duration to the duration of said burst to provide a first accumulated digital output signal;
   second means for accumulating said digital second color difference signals during said keying pulse to provide a second accumulated digital output signal;
   means for arithmetically combining said first accumulated digital output signal; with second digital signals to provide modified digital output signals;
   means for limiting the digital value of said modified digital output signals to provide intermediate digital control signals;
   means for providing digital control signals in response to said intermediate control signals, the sign bit of said first accumulated digital output signal, and said second accumulated digital output signal; and
   means responsive to said digital control signals for supplying said control signals to said chrominance subcarrier oscillator.

2. Color television circuitry in accordance with claim 1 wherein:
   said second digital signal represents a predetermined constant value.

3. Color television circuitry in accordance with claim 1 wherein:
   said second digital signal is a digital tint control signal.

4. Color television circuitry in accordance with claim 1 comprising:
   a memory for storing said second digital signal and providing said second digital signal to said combining means.

5. Color television circuitry in accordance with claim 1 wherein:
   said chrominance subcarrier oscillator comprises,
   a voltage controlled oscillator; and
   said supplying means comprises a digital to analog convertor having digital inputs coupled to said providing means and an analog output for supplying the control voltage to said voltage controlled oscillator.

6. Color television circuitry in accordance with claim 5 comprising;
   a digital low pass filter coupled between said providing means and said digital to analog convertor.

7. Color television circuitry in accordance with claim 5 comprising;
   an analog low pass filter for coupling said digital to analog convertor to said voltage controlled oscillator.

8. Color television circuitry in accordance with claim 1 wherein:
   said chrominance subcarrier oscillator generates second and third clock signals each of the frequency of said chrominance subcarrier frequency and having a predetermined phase relationship to each other;
   said first accumulating means being responsive to said third clock signal for accumulating said digital first color difference signals during coincidence of said keying pulse and said third clock signals; and
   said second accumulating means being responsive to said second clock signal for accumulating said digital second color difference signals during coincidence of said keying pulse and said second clock signals.

9. Color television circuitry in accordance with claim 8 wherein:
   said third clock signal leads said second clock signal by 90 degrees in phase.

10. Color television circuitry in accordance with claim 9 wherein:
    said digital first color difference signal is a digital red-minus-luminance signal, and
    said digital second color difference signal is a digital blue-minus-luminance signal.

11. Color television circuitry in accordance with claim 8 wherein:
    said first accumulating means comprises:

a first adder having a first addened input receiving said digital first color difference signals, a second addeded input and a sum output;

first memory means having an input coupled to said sum output and an output coupled to said second addened input; and second memory means having inputs coupled to said first memory means output for storing said first accumulated digital output signals and having outputs coupled to said combining means for supplying said first accumulated digital output signals thereto.

12. Color television circuitry in accordance with claim 11 wherein:

said second accumulating means comprises:

a second adder having a first addened input receiving said digital second color difference signals, a second addened input and a sum output;

third memory means having an input coupled to said second adder sum output and an output coupled to said second adder second addened input; and fourth memory means having inputs coupled to said third memory means output for storing said second accumulated digital output signals and having an output coupled to said providing means.

13. Color television circuitry in accordance with claim 12 wherein:

signals at said output of said first adder are stored in said first memory means during coincidence of said keying pulse and said third clock signal, and signals stored in said first memory means are transferred to said second memory means subsequent to said keying pulse; and signals at said output of said second adder are stored in said third memory means during coincidence of said keying pulse and said second clock signal; and signals stored in said third memory are transferred to said fourth memory means subsequent to said keying pulse.

14. Color television circuitry in accordance with claim 13 wherein:

said digital first color difference signal is a digital red-minus-luminance signal, and said digital second color difference signal is a digital blue-minus-luminance signal.

15. Color television circuitry in accordance with claim 1 wherein:

said providing means provides said intermediate control signals as said digital control signals where said sign bit of said first accumulated digital output signal and the sign bit of said second accumulated digital output signal have a first predetermined relationship, said providing means providing first predetermined signals or second predetermined signals as said digital control signals when said sign bit of said first accumulated digital output signal and said sign bit of said second accumulated digital output signal have a second or third predetermined relationship, respectively.

16. Color television circuitry in accordance with claim 15 wherein:

said digital first color difference signal is a digital red-minus-luminance signal, and said digital second color difference signal is a digital blue-minus-luminance signal.

* * * * *